May 21, 1963 A. A. WOLF 3,090,902
MOTOR CONTROL CIRCUIT UTILIZING A HALF WAVE MAGNETIC AMPLIFIER
Filed July 25, 1960

INVENTOR.
ALFRED A. WOLF
BY
Davis, Hoxie, Faithfull & Hapgood
ATTORNEYS.

United States Patent Office 3,090,902
Patented May 21, 1963

3,090,902
MOTOR CONTROL CIRCUIT UTILIZING A HALF WAVE MAGNETIC AMPLIFIER
Alfred A. Wolf, Dallastown, Pa., assignor to Fidelity Instrument Corporation, York, Pa., a corporation of Pennsylvania
Filed July 25, 1960, Ser. No. 45,068
1 Claim. (Cl. 318—331)

The present invention relates to the control circuit for a direct current motor and more particularly to a magnetic amplifying circuit for such control.

Motor control of small and medium sized direct current motors in the past has generally utilized thyratron circuits or full-wave magnetic amplifying circuits. Thyratron circuits require a warm-up period which may necessitate a time delay relay. Thyratron circuits do not filter the D.-C. output current as well as do magnetic amplifying circuis, so that in thyratron circuits the brushes of the motor are more rapidly worn out. To avoid such rapid wear, a filter is sometimes placed in the thyratron circuit, which, however, often results in erratic triggering of the circuit. Magnetic amplifying circuits have a longer life and are more rugged than are tube circuits, which is of particular benefit in applications in which the motor control undergoes shock, is subject to adverse erratic conditions or may be difficult to service, for example, in military applications. A full-wave magnetic amplifying circuit is described in "Speed Control of a D-C Motor Using a Magnetic Amplifier" by W. Leonhard, AIEE Transactions, vol. 76, Part 1, pp. 112–119, May 1957.

The half-wave magnetic amplifying circuit of the present invention is superior to full-wave magnetic amplifying circuits in certain applications where cost and size are of importance. The half-wave amplifying circuit is about one-half the size and considerably more economical than a comparatively rated full-wave circuit performing the same functions. The full-wave magnetic amplifying circuit costs more than the half-wave circuit as it requires an addiional transformer and rectifier. The full-wave magnetic amplifying circuit is generally more expensive than the thyratron half-wave tube circuit, but the half-wave magnetic amplifier of this invention generally is less expensive than the half-wave thyratron circuit.

In accordance with the present invention, constant full-wave alternating current is rectified to half-wave direct current which is connected to the field of a direct current motor so that the magnetic flux of the motor is constant. The speed of the motor, in the absence of a control circuit, would vary with the load upon the motor. To maintain a constant speed, despite variance in the load, the direct current to the armature is varied by a magnetic amplifier. The magnetic amplifier preferably includes two control windings, one for voltage regulation and one for curent control.

It is an object of this invention to provide an economical motor control for direct current motors of from 1/40 to 1/2 horse power so that their speed will be relatively constant regardless of the load on the motor.

It is a further object of this invention that such motor control be of rugged construction and not require a warm-up period.

It is a further object of this invention that such motor control provide means to predetermine the motor speed over a broad range of speeds.

Other objects will be apparent from the detailed description, taken in connection with the accompanying drawings, in which.

Figure 1:
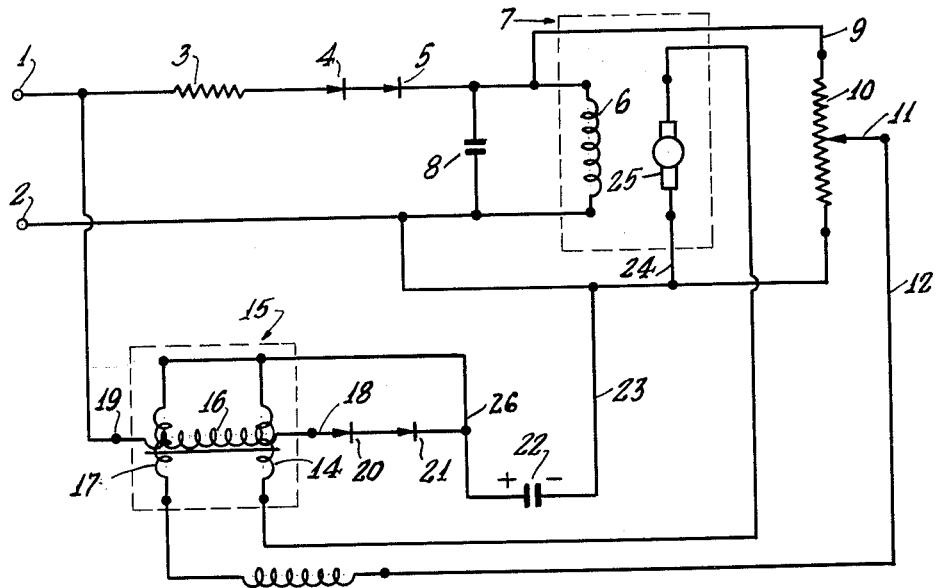
FIG. 1 is a circuit diagram of a preferred form of the invention.

In FIG. 1, the source of power, shown connected at terminals 1 and 2, is a 230 volts, 60 cycle alternating current source. With suitable changes in the circuit other values of alternating current power may be employed. The alternating current is limited by resistor 3 (of 44 ohms with a power capacity of 10 watts), so that currents over the rated value with not burn up the diodes 4 and 5. Although for cost reasons two diodes are shown, a single diode may be used. Diodes 4 and 5 convert the alternating full-wave current into direct half-wave current. The current is connected to field 6 of direct current motor 7 (shown within the dotted lines). As the current is constant, the field gives a constant magnetic flux. Capacitance 8 (of 60 microfarads rated at 450 volts direct current) across the lines leading to field 6 filters the power supplied to the field.

A lead 9 from the input side of the field 6 goes to a potentiometer 10 (variable resistance of 2,500 ohms, capacity of 50 watts). The movable arm 11 of potentiometer 10 is manually or automatically set in order to determine the speed of motor 7. Potentiometer 10 acts as a reference potential for the armature 25 of motor 7 in that the predetermined voltage across the potentiometer 10 determines the voltage across armature 25. In a direct current motor having a constant load and a constant flux from the field, within the rating of the motor, an increase in the voltage across the armature results in an increase in the speed of the motor. Arm 11 is connected through wire 12 to inductance choke 13 (of 20 henries) which blocks alternating current induced in the control winding 17 of the half-wave magnetic amplifier, shown within the dotted line at 15.

The magnetic amplifier 15 is constructed with one input-output winding 16 and two control windings 14 and 17. One side of control winding 14 is directly electrically connected to the output 26 of amplifier 15. The other control winding 17 is connected through choke 13 to potentiometer 11 and on the other side to the same output 26. Control winding 14, of a few turns of heavy wire, controls the output current of amplifier 15 so as to adjust the current to the load on the motor. Control winding 17, of many turns of finer wire, controls the voltage output of the amplifier. The power input 19 to power winding 16 of amplifier 15 is from one side 1 of the alternating current power source, and the output 18 is to a series of diodes 20 and 21 of 400 volt rating. The direct current output of diode 21, filtered by capacitor 22 (of 60 microfarads rated at 450 volts direct current) is to conductor 23 and to the input side 24 of armature 25.

In operation, the desired motor speed is determined by setting arm 11 of potentiometer 10. The voltage across armature 25 is thereafter constant and approximately equal to the voltage across potentiometer 10 for a given motor load. As the motor load increases, the current in control winding 14 increases, causing the amplifier to compound, that is, increase the voltage to the motor armature to prevent excessive fall in motor speed.

If not controlled by a control circuit, an increase in load would tend to slow the motor rotation. To maintain the same speed with an increase in load, an increase in motor torque is required. The current in control winding 14 tends to increase with an increase in load causing more current to flow through amplifier 15. The greater flow of current to armature 7 tends to raise the torque of the motor and restore it to the predetermined speed. By correctly proportioning the current control winding in view of the motor size, an almost constant speed may be maintained regardless of load. With the circuit as described above, a constant speed may be maintained over a range from the slowest predetermined revolutions per minute of the motor to 50 times that speed.

Figure 2:
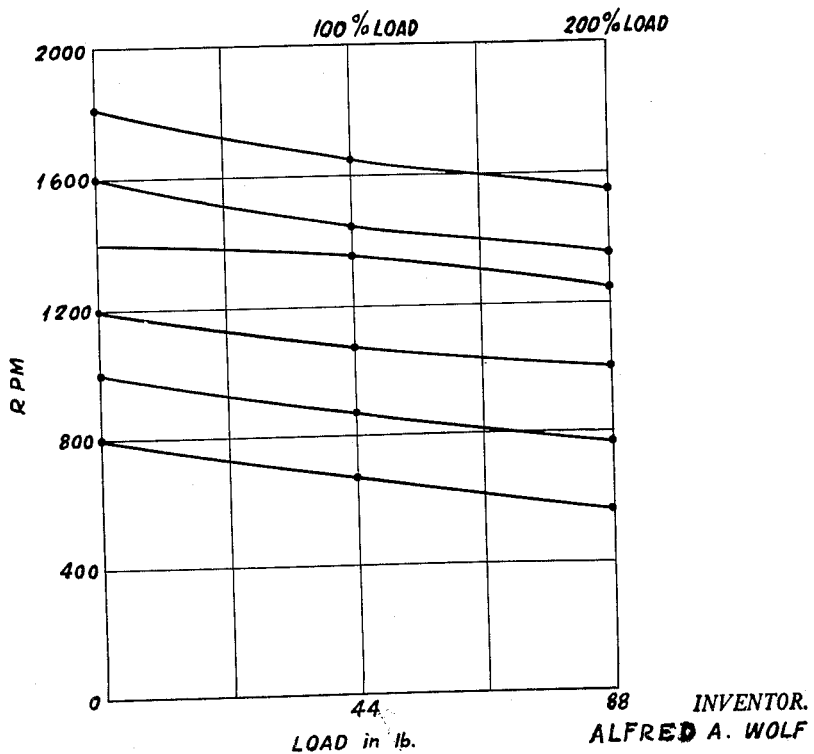
FIG. 2 is a graph of motor speed plotted against motor load for a motor and its control circuit utilizing the present invention.

In FIG. 2, the revolutions per minute of a 1/15 H.P. direct current motor driven from a 230 volts alternating current source and controlled by the above-described circuit has been plotted against a load which varied from 0 to 88 in.-lbs., with a rated load of 44 inch pounds. Regulation to within 10 percent of initial value was attained, which is considered satisfactory for many applications.

The theory of operation of the circuit of FIG. 1 is as follows:

Since the circuit is of the half-wave rectification type, alternating current flows through the input-output (power) winding 16 only during alternate positive oscillations of the applied voltage, i.e., when the voltage at point 18 is positive with respect to the voltage at the cathode (output electrode) of the rectifier element 21. This pulsating direct current in winding 16 supplies most of the D.C. energy required to attain complete saturation of the core of the magnetic amplifier 15 and the amplifier is therefore self-saturating.

The armature voltage sensing control winding 17 and the armature current sensing control winding 14 are connected on the output side of the rectifiers 20 and 21 and benefit by the filtering of the pulsating D.C. current provided by the capacitor 22 and the resistance and inductance of the armature 25. During the portion of the A.C. cycle when there is no conduction, direct current energy is stored across the filter capacitor 22. By thus arranging the sensing windings, a more nearly constant and more effective flux is developed in the core of the magnetic amplifier during the conducting and non-conducting portions of the cycle.

The current sensing winding 14, in series with the armature load, is a low reactance winding consisting of but a few turns of heavy wire and therefore the voltage drop across it, resulting from the current through it, is minute and may be neglected for the purpose of analysis. Energy stored in the filter capacitance 22 flows through winding 14 to the load circuit during non-conducting portions of the cycle. Winding 14 is polarized to assist or increase the saturation of the core in the same manner as the power winding 16 when the motor voltage is less than the reference voltage. Winding 14 is more effective in its control of the core saturation than would be a few additional turns in the power winding 16.

One terminal of the voltage sensing control winding 17, also polarized for positive feedback, is similarly connected to the filtered output side of the rectifier to increase the effectiveness of the winding. The opposite end of winding 17 is effectively connected, via the A.C. impedance device 13, to the tap 11 of the potentiometer 10. The potentiometer 10 is connected across a relatively fixed source of D.C. potential to provide a substantially constant adjustable reference voltage for determining the speed of motor rotation. The armature coil is of relatively high impedance, consisting of many turns of fine wire. The potentiometer impedance is relatively low, to minimize any cross effects of armature voltage changes on the voltage at tap 11. The saturation control flux in coil 17 is produced by the difference between the armature voltage and the constant D.C. reference potential established by the tap setting on speed control potentiometer 10. This difference signal varies with the voltage fluctuations at the armature that result from motor load changes.

When the motor is operating at the speed selected at the potentiometer 10, an increase in load on the motor tends to lower the speed and thereby decrease the armature current and voltage. The decrease in armature voltage detected by the sensing coil 17 tends to cause further core saturation and the consequent reduction in power winding reactance tends to increase the flow of energy to the armature and restore the system to the desired speed. The increase in armature current detected by the sensing coil 14 also increases core saturation, which further increases energy flow to the armature.

Since all of the windings 14, 16 and 17 are wound on a common core, pulsating current flow in the main winding 16 will cause induced voltage to appear in windings 14 and 17. If these induced voltages were to be induced into loop circuits having low self-impedance, there would arise induced currents which would increase the reactance of the control winding 16, rather than decrease it, as is desirable. Since the current sensing winding constitutes few turns, this induced voltage is practically negligible and may be overlooked. The voltage sensing winding 17 is, however, of many turns and is connected to a low impedance circuit comprising the armature winding and a portion of the speed control potentiometer. The high A.C. impedance device 13, having a low D.C. self-resistance, minimizes the A.C. current flow in winding 17 and thus minimizes the back E.M.F. without affecting the effectiveness of the D.C. control. The problem solved by impedance device 13 (undesirable currents being induced into the high impedance control windings) does not arise in control systems of the non-self-saturating type, because their power windings are commonly split into two sections which are serially connected in phase opposition to effect flux cancellation in the core. In the circuit of the present invention, a self-saturating circuit using a unitary core structure, there is no such flux cancellation.

It may seem desirable to connect the upper terminal of the voltage sensing winding 17 directly to the armature winding, rather than ahead of the current sensing winding, as in the circuit of FIG. 1. The voltage across the current sensing winding 14 is substantially zero due to its low impedance, and so connecting it as shown in FIG. 1 will not substantially disturb the electrical characteristics of the circuit but is useful in that the connection between windings 14 and 17 is within the magnetic amplifier and external terminals and external wiring are not required for that connection.

By utilizing a self-saturating magnetic amplifier with the current and voltage sensing control coils, it is possible to realize power gains in the order of 5000 or more as compared to power gains of the order of 25 of previous arrangements.

Modifications may be made in the described form within the scope of the invention and the subjoined claim.

I claim:

In a self-saturable magnetic amplifier circuit to automatically regulate the speed of a direct current motor, the motor having an armature and a field winding and being powered from an alternating current power source through a half-wave rectifier which supplies pulsating direct current to saturate the amplifier, the circuit including
  a source of adjustable direct current speed control reference voltage,
  an auxiliary high impedance saturation control winding in the amplifier to control saturation of the amplifier connected between a terminal of the armature and the D.C. reference voltage so that the voltage of the winding equals the difference between the armature voltage and the said reference voltage, and
  a power winding in the amplifier connected between the power source and the armature,
the improvements comprising
  an auxiliary low impedance saturation control winding in the amplifier to control saturation of the amplifier directly connected in series with said armature and adapted to carry the current of the motor armature,
  a filter capacitance connected in series between the low impedance winding and the armature so that it is across the armature and the low impedance winding, and a high reactance device serially connected with the high impedance winding.

References Cited in the file of this patent

UNITED STATES PATENTS

| | | |
|---|---|---|
| 2,558,094 | King | June 26, 1951 |
| 2,652,525 | Nichols | Sept. 15, 1953 |
| 2,716,726 | Lamm | Aug. 30, 1955 |
| 2,735,060 | Malick | Feb. 14, 1956 |
| 2,807,768 | Sherlock et al. | Sept. 24, 1957 |
| 3,024,405 | Rosenblatt | Mar. 6, 1962 |

FOREIGN PATENTS

| | | |
|---|---|---|
| 1,048,540 | France | Aug. 5, 1953 |